US012014589B2

(12) United States Patent
Tessier et al.

(10) Patent No.: US 12,014,589 B2
(45) Date of Patent: Jun. 18, 2024

(54) SYSTEM WITH CONTROL DEVICE AND METHOD FOR VEHICLE PROXIMITY REMOTE

(71) Applicant: FORTIN SYSTEMES ELECTRONIQUES, Anjou (CA)

(72) Inventors: Martin Tessier, Repentigny (CA); Duc Minh Cong Nguyen, St-Leonard (CA)

(73) Assignee: FORTIN SYSTÈMES ÉLECTRONIQUES, Montreal (CA)

( * ) Notice: Subject to any disclaimer, the term of this patent is extended or adjusted under 35 U.S.C. 154(b) by 109 days.

(21) Appl. No.: 17/704,625

(22) Filed: Mar. 25, 2022

(65) Prior Publication Data

US 2022/0309850 A1 Sep. 29, 2022

Related U.S. Application Data

(60) Provisional application No. 63/166,512, filed on Mar. 26, 2021.

(51) Int. Cl.
*G07C 9/00* (2020.01)
*G07C 9/28* (2020.01)

(52) U.S. Cl.
CPC ........... *G07C 9/00309* (2013.01); *G07C 9/28* (2020.01); *G07C 2009/00769* (2013.01)

(58) Field of Classification Search
CPC .................. G07C 9/00309; G07C 9/28; G07C 2009/00769; G07C 2009/00365; G07C 2009/00587; G07C 9/00944
(Continued)

(56) References Cited

U.S. PATENT DOCUMENTS 5,448,110 A * 9/1995 Tuttle .................. H04L 61/5038 257/723
5,642,102 A * 6/1997 Panther ................ G08B 3/1058 455/158.2
(Continued)

FOREIGN PATENT DOCUMENTS

JP 2001178002 A * 6/2001 ............ F24C 15/104
WO WO-2014167403 A1 * 10/2014 ......... G07C 9/00111

OTHER PUBLICATIONS

JP_2001178002_A; Iwata Katsumi et al., power supply device, (Jun. 29, 2001), print out with translation, p. 1 to 10. (Year: 2001).*

*Primary Examiner* — Nam V Nguyen
(74) *Attorney, Agent, or Firm* — Wolter Van Dyke Davis, PLLC; Michael W. Taylor

(57) ABSTRACT

A system and method for controlling a transmission of electrical signals (11) by a proximity remote (10) to a receiver (22) for regulating a remote access to premises of a vehicle. The proximity remote (10) is configured to be powered by a battery (19) mounted therein on first and second battery base contacts (24, 25). The system includes: a internal control device (20) insertable within the proximity remote (10) and connectable to the first and second battery base contacts (24, 25); first and second conductors (27) connectable to the control device (20) at respective first and second contacts thereof for controlling a power supplied to the proximity remote (10); and a power supply control device (28) connectable to the first and second connectors (27) for controlling the power supplied to the proximity remote (10), thereby respectively permitting and inhibiting the transmission.

8 Claims, 6 Drawing Sheets

(58) Field of Classification Search
USPC .......................................... 340/3.1, 5.6, 7.32
See application file for complete search history.

(56) References Cited

U.S. PATENT DOCUMENTS

| | | | | | |
|---|---|---|---|---|---|
| 5,729,000 | A * | 3/1998 | Sugimoto | G06K 7/0021 235/441 |
| 6,255,951 | B1 * | 7/2001 | De La Huerga | A61J 1/035 340/5.8 |
| 8,606,214 | B2 * | 12/2013 | Hilgers | G08C 17/02 455/343.1 |
| 8,686,663 | B2 * | 4/2014 | Ishikita | H05B 31/50 315/296 |
| 8,965,287 | B2 * | 2/2015 | Lam | G07C 9/00309 455/41.2 |
| 9,152,906 | B2 * | 10/2015 | Deffontaines | G06K 19/0727 |
| 9,728,022 | B2 * | 8/2017 | Gengler | G07C 9/00174 |
| 10,146,284 | B2 * | 12/2018 | Petrovic | G06F 1/263 |
| 2005/0043859 | A1 * | 2/2005 | Tsai | H02J 3/46 307/65 |
| 2011/0234370 | A1 * | 9/2011 | Briese | G07C 9/00309 340/5.6 |
| 2014/0013135 | A1 * | 1/2014 | Matos | G06F 1/263 713/323 |
| 2020/0227926 | A1 * | 7/2020 | McCracken | H02J 13/00002 |

* cited by examiner

SYSTEM WITH CONTROL DEVICE AND METHOD FOR VEHICLE PROXIMITY REMOTE

CROSS REFERENCE TO RELATED APPLICATION

This application claims priority on U.S. Provisional Application No. 63/166,512, which is herein incorporated by reference in its entirety.

FIELD OF THE INVENTION

The present invention relates to after-market installations such as car-sharing applications or fleet management for vehicles. In particular, the invention relates to a control device and method for controlling a power supply of a proximity remote.

BACKGROUND OF THE INVENTION

New technologies in the domain of the automotive security restrain after-market installations, such as car-sharing or fleet management applications in vehicles. In some cases, the after-market products are not compatible with these automotive innovations. Formerly, the driver would mechanically insert a key in the barrel in order to start the vehicle. Today, many vehicles electronically validate the key that the driver is attempting to use to start the vehicle and either is permissive and allows the vehicle to start, or is restrictive and inhibits the vehicle from starting. In this case, the key or proximity remote is able to communicate to the vehicle using radio signals. If the pre-programmed key or remote is not within proximity when the driver attempts to start the vehicle various countermeasures inhibit the vehicle from starting. However, if a valid proximity remote was left somewhere within the vehicle, the vehicle would never inhibit itself from starting thus allowing anyone to start the vehicle at any time.

U.S. Pat. No. 7,952,226 (TESSIER et al.) discloses a system and method for controlling the radio frequency emissions of a proximity remote keyless system for permitting or denying remote access to premises of a vehicle. The source power is controlled to thereby control when the vehicle is authorized to start. The proximity remote can thus be left in the vehicle and controlled by another external source. The device of the invention is adapted to be inserted between a battery, which powers the proximity remote, and insulates the battery from an associated battery base contact. The device comprises a conductive contact on opposite sides of an insulating plate and at least one wire connected to each conductive contact. The wires can be connected to an external device, thus allowing external electrical or mechanical control of the proximity remote, with the proximity remote being only able to transmit to the vehicle if the battery is connected to the battery base contact.

The drawbacks of the above known system and method is that it requires changing the battery of the proximity remote over the time when it is discharged or when it becomes defective. Also, the battery of the proximity remote may be affected by the ambient temperature and not function properly dependent on if the temperature is relatively too low or too high.

SUMMARY OF THE INVENTION

According to the present invention, there is provided a system for controlling a transmission of electrical signals by a proximity remote to a receiver for regulating a remote access to premises of a vehicle, the proximity remote being configured to be powered by a battery mounted therein on first and second battery base contacts, the system comprising: an internal control device insertable within the proximity remote, the internal control device having a first conducting portion connectable to the first battery base contact and a second conducting portion connectable to the second battery base contact; first and second conductors connectable to the internal control device at respective first and second contacts for controlling a power supplied to the proximity remote; and an external power supply control device connectable to the first and second connectors for controlling the power supplied to the proximity remote via the internal control device, thereby respectively permitting and inhibiting the transmission.

In embodiments, the internal control device comprises a printed circuit board.

In embodiments, the internal control device includes a portion that is shaped as a coin-shaped battery.

In embodiments, the first battery base contact is positioned to make contact to the first conducting portion at a side edge of the internal control device, while the second battery base contact is positioned to make contact to the second conducting portion on an underneath part of the control device.

In embodiments, the external power supply control device comprises an external battery or external power supply connected to a relay or switch for permitting and inhibiting the transmission.

In embodiments, there is provided control device for controlling a transmission of electrical signals by a proximity remote to a receiver for regulating a remote access to premises of a vehicle, the proximity remote being configured to be powered by a battery mounted therein on first and second battery base contacts, the control device comprising: a coin-shaped element insertable within the proximity remote, the internal control device having a first conducting portion connectable to the first battery base contact and a second conducting portion connectable to the second battery base contact; and first and second conductors connectable to the control device at respective first and second contacts for controlling a power supplied to the proximity remote, wherein the control device is operatively connectable to an external power supply control device via the first and second connectors for controlling a power supplied to the proximity remote, thereby respectively permitting and inhibiting the transmission.

According to another aspect of the present invention, there is provided a method for controlling a transmission of electrical signals by a proximity remote to a receiver for regulating a remote access to premises of a vehicle, the proximity remote being configured to be powered by a battery mounted therein on first and second battery base contacts, the method comprising: inserting an internal control device within the proximity remote having the first battery base contact and the second battery base contact, the internal control device having a first conducting portion connectable to the first battery base contact and a second conducting portion connectable to the second battery base contact; and controlling a power supplied to the control device by means of an external power supply control device connectable to the internal control device via first and second conductors for controlling the power supplied to the proximity remote, thereby respectively permitting and inhibiting the transmission.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
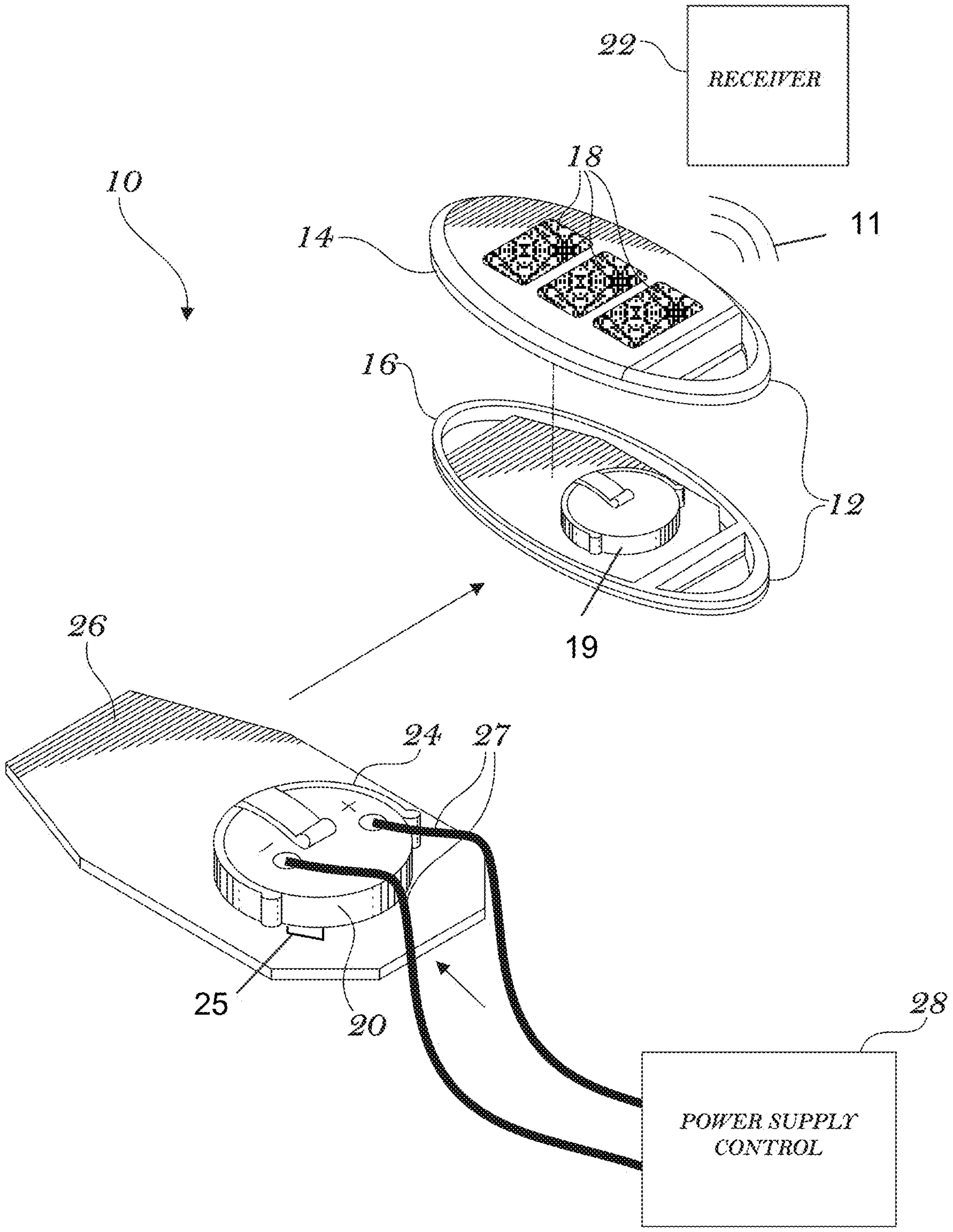
FIG. 1 is a perspective exploded view of an internal control device being placed within a proximity remote, according to a preferred embodiment of the present invention.

Referring now to FIG. 1, and in accordance with an illustrative embodiment of the present invention, a proximity remote keyless system, generally referred to using the reference numeral 10, will now be described. The proximity remote 10 permits or denies access from a distance to premises of a vehicle (not shown), illustratively an automobile, and is contained in a key fob 12 illustratively formed by two mated half shells 14 and 16. A plurality of buttons as in 18 dedicated to starting the vehicle, locking or unlocking the doors and opening the trunk (not shown) of the vehicle are also provided on an outer surface of the key fob 12. As is known, the proximity remote 10 may be powered by one or more batteries as in 19, which enable the proximity remote 10 to transmit information (e.g. in the form of radio frequency emissions) to a remote receiver 22. The remote receiver 22 is illustratively a component within the vehicle, which is adapted to receive information from the proximity remote 10 so as to allow the vehicle to start only after an expected, valid or properly formed radio wave has been received from the proximity remote 10.

Still referring to FIG. 1, the battery 19 is illustratively mounted on a first base battery contact or clip 24 used to maintain the placement of the battery 19 and a second base contact 25 to ensure a closed power circuit (not shown) between the battery 19 and the base contacts 24, 25 to supply power to the proximity remote 10. According to the present invention, the battery 19 is removed and replaced by an internal control device 20 that is inserted within the proximity remote 10. The internal control device 20 has a first conducting portion 30 or side edge connectable to the first battery base contact 24 and a second conducting portion 32 connectable to the second battery base contact 25. First and second conductors 27 are connected to the control device 20 at respective first and second contacts 34, 36 (at positive and negative contacts thereof shown in FIG. 3) for controlling a power supplied to the proximity remote 10. An external power supply control device 28 is connected to the first and second connectors 27 for controlling the power supplied to the proximity remote 10 via the internal control device 20, thereby respectively permitting and inhibiting the transmission. The conductors 27 may be of one to three feet or longer to allow suitable connection to the external power supply control device 28.

In a preferred embodiment, the internal control device 20 is shaped as a coin-shaped battery, such as battery 19 for permitting easy insertion thereof into the proximity remote 10. The internal control device 20 may have different sizes (i.e. thickness, diameter) matching with different models of the proximity remote 10. The second battery base contact 25 may be positioned opposite to the first base contact 24. The second battery base contact 25, may illustratively be another clip similar to base contact 24, an electrical lead or a printed area on a printed circuit board 26 for conducting power from the battery 19 to the printed circuit board 26. The battery 19, the internal control device 20 and associated base contacts 24, 25 are illustratively mounted on a printed circuit board 26 powered by the battery 19 or internal control device 20 to transmit information related to the presence of the proximity remote 10 to the vehicle.

In embodiments, the first battery base contact 24 is positioned to make contact to the first conducting portion 30 at a side edge of the internal control device 20.

In embodiments, the second battery base contact 25 is positioned to make contact to the second conducting portion 32 on an underneath part 31 of the control device 20.

Figure 2:
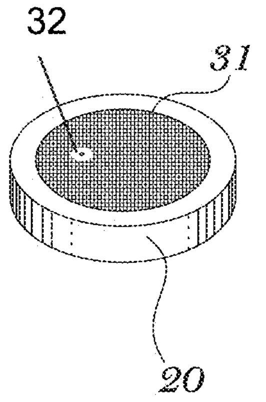
FIG. 2 is a perspective underneath view of the internal control device shown in FIG. 1.
Figure 3:
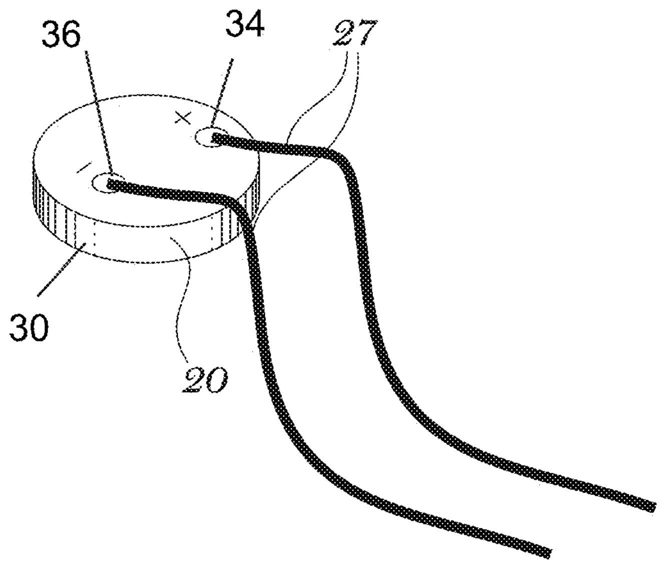
FIG. 3 is a perspective top view of the internal control device shown in FIG. 1.
Figure 4:
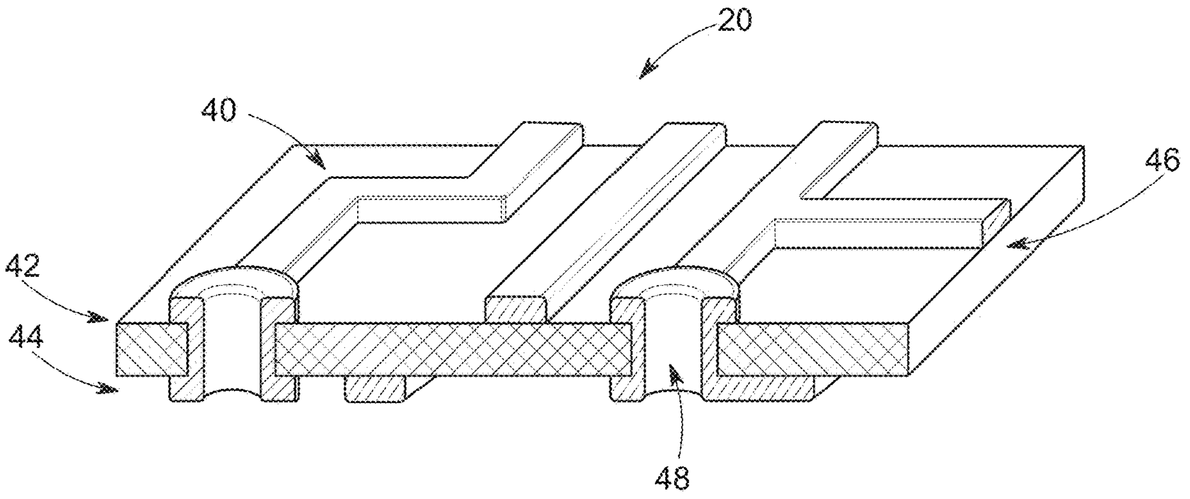
FIG. 4 is a perspective section view of an internal control device, according to a preferred embodiment of the present invention.

Preferably, referring now to FIG. 4, in addition to FIG. 1 to FIG. 3, the internal control device 20 includes a printed circuit board (PCB) for enabling the proper connections between the first and second conducting portions 30, 32 and the respective first and second contacts 34, 36. The top first contact 34 (positive contact) and the side edge 30 of the PCB are connected together while with second conducting portion 32 at the bottom or underneath part 31 is connected to the top second contact 36 (negative contact), which are isolated from the top first contact 34 and side edge 30. This allows the internal control device 20 to make contact in the socket of the proximity remote 10 on the side and the top in the same way as the standard or regular battery 19. The PCB includes a solder masks or solder stop masks or solder resists 40 that are thin lacquer-like layers of polymer that are applied to the copper traces of the printed circuit board (PCB). The PCB includes a top layer 42 and bottom layer 44 that sandwich a core 46. The top and bottom layers 42, 44 are made of ½ copper (Cu) Clad. The total thickness of the copper (Cu) top and bottom layers 42, 44 is about 0.0014 inches. The core 46 has a thickness of about 0.059 inches. Two drill holes 48 are copper (Cu) plated. The stack height or thickness of the PCB is about 0.061 inches plus the copper (Cu) plating of the post drill holes 48 of 0.002 inches gives a total overall thickness of about 0.063 inches. As persons skilled in the art, these values may be modified to match the sizes of the battery 19 that is to be replaced.

In embodiments, the side edge 30 of the PCB includes a side plating for providing a continuous conducting surface on the side thereof.

According to a preferred aspect of the present invention, the battery 19 is first removed and replaced by the internal control device 20. The proximity remote 10 is then powered by the external power supply control device 28 via the control device 20, which enables the proximity remote 10 to transmit information to a remote receiver 22.

Figure 5:
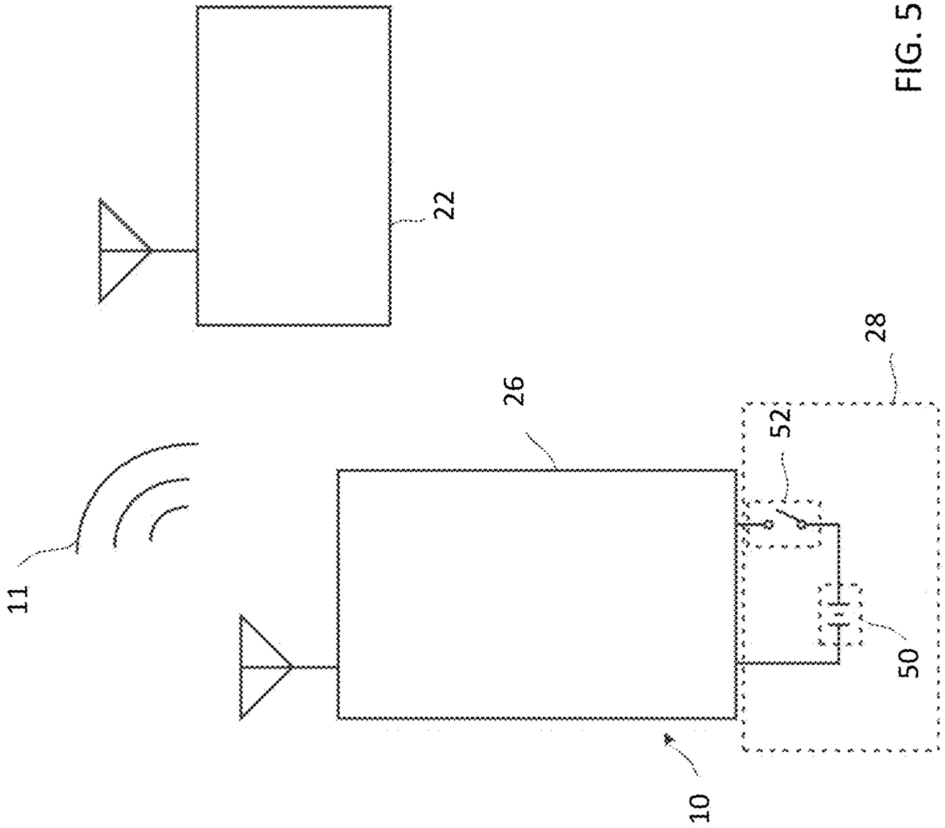
FIG. 5 is a schematic block diagram of a proximity remote connected to a power supply control device, according to a preferred embodiment of the present invention.

Referring to FIG. 5, in addition to FIG. 1 to FIG. 4, the external power control supply device 28 is therefore able to control the power supplied to the proximity remote 10 via the internal control device 20. The external power control supply device 28 may include an external battery or external power supply 50 connected in series to a relay or switch 52. The positive polarity of the external power supply 50 is connectable via the relay or switch 52 to the positive first contact 34 via one of the conductors 27. The negative polarity of the external power supply 50 is connectable to the negative second contact 36 via the other one of the conductors 27. In an enabled mode, the external power control supply device 28 enables the proximity remote 10 to transmit information to the receiver 22 when the relay or switch 52 is closed. However, in a disabled mode, the external power control supply device 28 does not supply power to the control device 20 and it is therefore impossible for the proximity remote 10 to transmit information to the receiver 22 when the power circuit is open (i.e. disconnected) when the relay or switch 52 is open.

The external power supply 50 may include an existing vehicle's engine battery or backup battery (12 Volts up to 48 Volts) regulated through a linear DC Voltage regulator or DC-DC step down converter adjusted to the remote required input voltage. Alternatively, the external power supply 50 may be adjusted to 6 Volts in case of replacement of two batteries connected in series of 3 Volts each. The external power supply may also be an AC to DC converter or any suitable DC power source for supplying the appropriate power the proximity remote 10.

Figure 6:
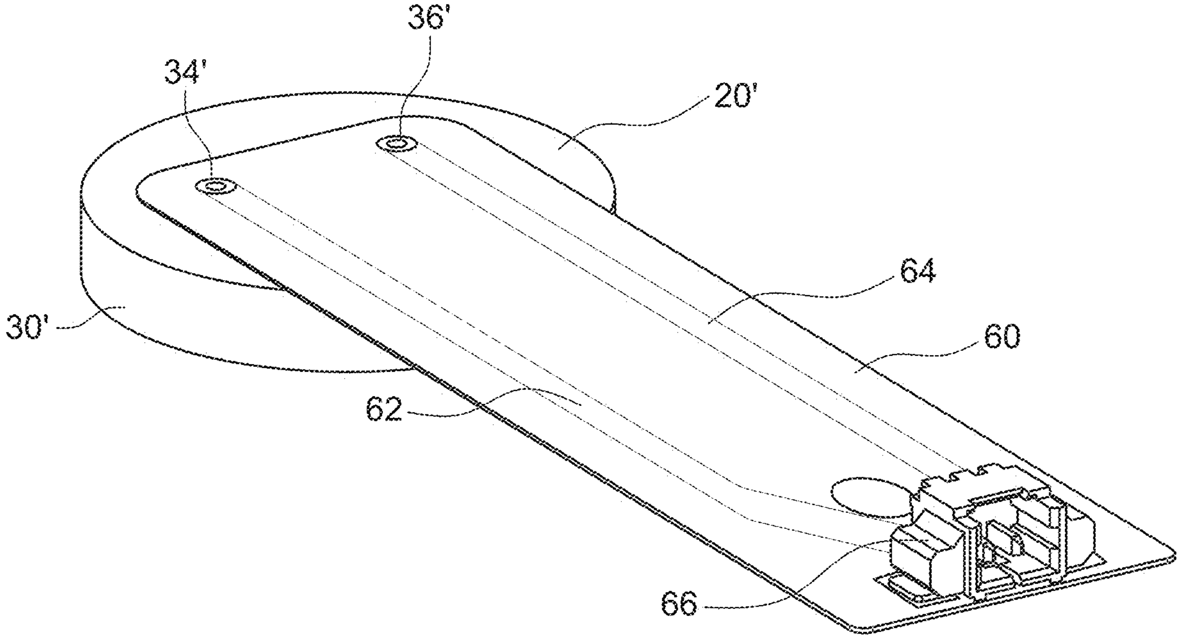
FIG. 6 is a perspective top view of an internal control device, according to another preferred embodiment of the present invention.
Figure 7:
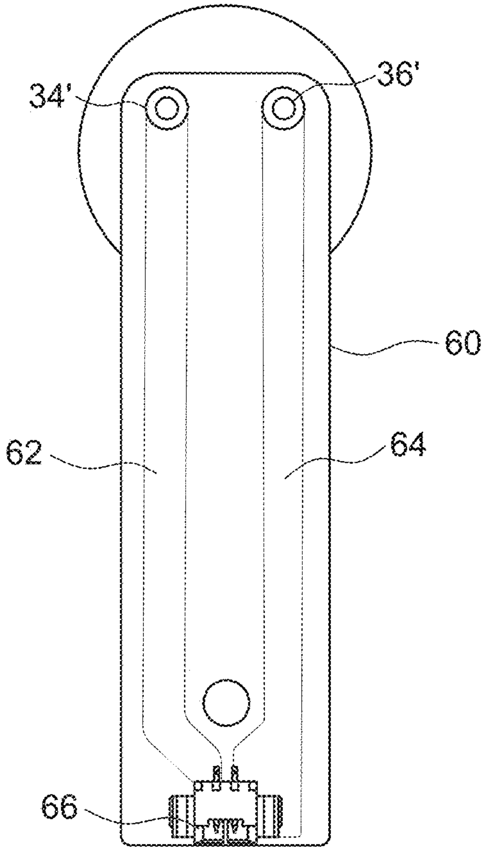
FIG. 7 is a top view of the internal control device shown in FIG. 6.
Figure 8:
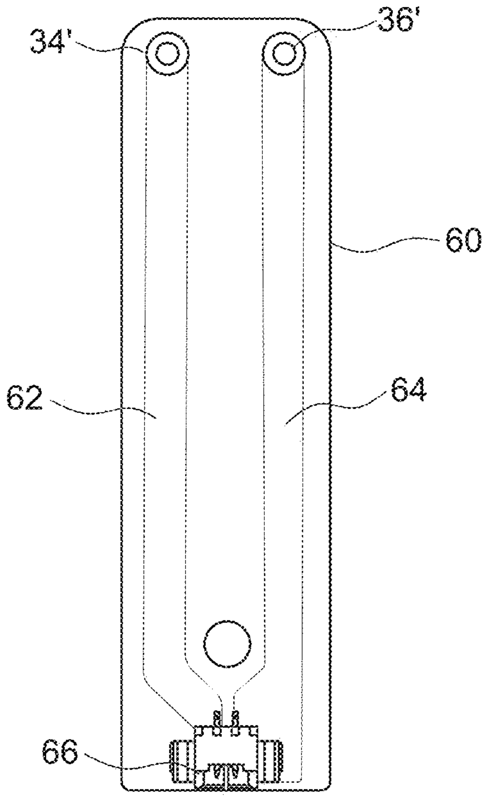
FIG. 8 is a top view of the internal control device shown in FIG. 6, without a battery coin-shaped element.

Referring now to FIG. 6 to FIG. 8, and in accordance with another illustrative embodiment of the present invention, an internal control device 20' will now be described. The internal control device 20' is functionally equivalent to the control device 20 shown in FIG. 1 to FIG. 3. Similarly, as explained above in relation to FIG. 1, the battery 19 of the key fob 12 is removed and replaced by the internal control device 20' that is inserted within the proximity remote 10. The internal control device 20' may have a portion or element 21 shaped as a coin-shaped battery, such as battery 19 for permitting easy insertion thereof into the proximity remote 10.

The internal control device 20' has a first conducting portion 30' or side edge connectable to the first battery base contact 24 and a second conducting portion (not shown) connectable to the second battery base contact 25. The internal control device 20' includes a printed circuit board (PCB) 60 that replaces the first and second conductors 27 shown in FIG. 3. The PCB 60 has a first trace or conductor 62 and second trace or conductor 64 that are respectively connected to the first contact 34' (positive terminal VCC) and a second contact 36' (negative or ground GND) for controlling a power supplied to the proximity remote 10. A female connector 66 is operatively connected to the traces 62, 64 and is configured to receive a male connector (not shown) for controlling the power supplied to the proximity remote 10.

An advantage of the present system and method compared by the prior art system and method is to avoid changing the battery 19 of the proximity remote 10 over time when it is discharged or defective. Also, the proximity remote 10 with control device 20 is much less affected by the ambient temperature compared to the use of the battery 19.

Another advantage of the present system and method is that the internal control device 20 or 20' with external power supply device 28 may be used in conjunction with car-sharing applications.

The scope of the claims should not be limited by the preferred embodiments set forth in the examples but should be given the broadest interpretation consistent with the description as a whole.

The invention claimed is:

1. A system for controlling a transmission of electrical signals by a proximity remote to a receiver for regulating a remote access to premises of a vehicle, the proximity remote being configured to be powered by a battery mounted therein on first and second battery base contacts, the system comprising:

an internal control device insertable within the proximity remote in place of the battery, the internal control device having a first conducting portion connectable to the first battery base contact and a second conducting portion connectable to the second battery base contact;

first and second conductors connectable to the internal control device at respective first and second contacts for controlling a power supplied to the proximity remote, with the first and second conductors extending external the proximity remote; and an external power supply control device external the proximity remote and connectable to the first and second connectors for controlling the power supplied to the proximity remote via the internal control device, with the external power supply control device comprising a power supply connected to a relay or switch, with the relay or switch having open and closed positions for regulating the remote access to premises of the vehicle by the internal control device, with the closed position permitting the transmission of the electrical signals by the proximity remote to the receiver and the open position inhibiting the transmission of the electrical signals by the proximity remote to the receiver.

2. The system of claim 1, wherein the internal control device comprises a printed circuit board (PCB).

3. The system of claim 1, wherein the internal control device includes a portion that is shaped as a coin-shaped battery.

4. The system of to claim 1, wherein the first battery base contact is positioned to make contact to the first conducting portion at a side edge of the internal control device.

5. The system of claim 1, wherein the second battery base contact is positioned to make contact to the second conducting portion on an underneath part of the control device.

6. The system of claim 1, wherein the power supply comprises a battery.

7. A control device for controlling a transmission of electrical signals by a proximity remote to a receiver for regulating a remote access to premises of a vehicle, the proximity remote being configured to be powered by a battery mounted therein on first and second battery base contacts, the control device comprising:

a coin-shaped element insertable within the proximity remote in place of the battery, the internal control device having a first conducting portion connectable to the first battery base contact and a second conducting portion connectable to the second battery base contact; and first and second conductors connectable to the control device at respective first and second contacts for controlling a power supplied to the proximity remote, with the first and second conductors extending external the proximity remote;

wherein the control device is operatively connectable to an external power supply control device via the first and second connectors for controlling a power supplied to the proximity remote, with the external power supply control device comprising a power supply connected to a relay or switch, with the relay or switch having open and closed positions for regulating the remote access to premises of the vehicle by the control device, with the closed position permitting the transmission of the electrical signals by the proximity remote to the receiver and the open position inhibiting the transmission of the electrical signals by the proximity remote to the receiver.

8. A method for controlling a transmission of electrical signals by a proximity remote to a receiver for regulating a remote access to premises of a vehicle, the proximity remote being configured to be powered by a battery mounted therein on first and second battery base contacts, the method comprising:

inserting an internal control device within the proximity remote in place of the battery, with the proximity remote having the first battery base contact and the second battery base contact, the internal control device having a first conducting portion connectable to the first battery base contact and a second conducting portion connectable to the second battery base contact; and controlling a power supplied to the internal control device by an external power supply control device connectable to the internal control device via first and second conductors extending external the proximity remote for controlling the power supplied to the proximity remote, with the external power supply control device comprising a power supply connected to a relay or switch, with the relay or switch having open and closed positions for regulating the remote access to premises of the vehicle by the control device, with the closed position permitting the transmission of the electrical signals by the proximity remote to the receiver and the open position inhibiting the transmission of the electrical signals by the proximity remote to the receiver.

* * * * *